United States Patent
Deng et al.

(10) Patent No.: US 12,195,118 B2
(45) Date of Patent: Jan. 14, 2025

(54) SYSTEMS AND METHOD FOR ELECTRONIC POWER STEERING REDUNDANT BUS COMMUNICATION

(71) Applicant: STEERING SOLUTIONS IP HOLDING CORPORATION, Saginaw, MI (US)

(72) Inventors: Yuan (Jason) Deng, Jiangsu (CN); Yuting (Austin) Geng, Jiangsu (CN); Lei (Ryan) Zhang, Jiangsu (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 211 days.

(21) Appl. No.: 16/855,339

(22) Filed: Apr. 22, 2020

(65) Prior Publication Data

US 2021/0331740 A1      Oct. 28, 2021

(51) Int. Cl.
  *B62D 6/02*   (2006.01)
  *B60R 16/023*   (2006.01)
  (Continued)

(52) U.S. Cl.
  CPC ............ *B62D 6/02* (2013.01); *B60R 16/0231* (2013.01); *B62D 5/046* (2013.01); *G07C 5/0808* (2013.01)

(58) Field of Classification Search
  CPC ........ B62D 6/02; B62D 5/046; B62D 5/0484; B62D 5/0481; B62D 5/0457;
  (Continued)

(56) References Cited

U.S. PATENT DOCUMENTS 7,107,134 B1 *   9/2006   Melby ................ B60W 50/029
                                                                701/57
9,607,449 B1 *   3/2017   Chen ...................... G07C 5/008
(Continued)

FOREIGN PATENT DOCUMENTS

CN      102917940 A      2/2013
CN      103404066 A      11/2013
(Continued)

OTHER PUBLICATIONS

Translation of CN-109693707-A retrieved from PE2E Search on Sep. 25, 2023 (Year: 2023).*
(Continued)

*Primary Examiner* — Thomas Ingram
*Assistant Examiner* — Faris Asim Shaikh
(74) *Attorney, Agent, or Firm* — Dickinson Wright PLLC

(57) ABSTRACT

A method for providing steering assist for a vehicle includes determining whether a primary communication system of the vehicle communicated a first vehicle speed signal, the first vehicle speed signal indicating a first vehicle speed of the vehicle. The method also includes, in response to a determination that the primary communication system did not communicate the first vehicle speed signal, detecting a fault in the primary communication system. The method also includes, in response to detecting the fault in the primary communication system, determining whether a secondary communication system communicated a second vehicle speed signal, the second vehicle speed signal indicating a second vehicle speed of the vehicle. The method also includes, in response to a determination that the secondary communication system communicated the second vehicle speed signal, selectively providing steering assist to a steering mechanism of the vehicle based on the second vehicle speed of the vehicle.

12 Claims, 4 Drawing Sheets

(51) Int. Cl.
  *B62D 5/04* (2006.01)
  *G07C 5/08* (2006.01)
(58) Field of Classification Search
  CPC   B62D 5/0487; B62D 5/0493; B60R 16/0231; H02P 29/024; H02P 29/028; G07C 5/0808
  See application file for complete search history.

(56) References Cited

U.S. PATENT DOCUMENTS

| | | | |
|---|---|---|---|
| 2007/0069674 A1* | 3/2007 | Koeppl | B62D 5/0484 318/432 |
| 2013/0066523 A1* | 3/2013 | Iwamoto | B62D 5/0493 701/41 |
| 2013/0204493 A1* | 8/2013 | Ricci | G06F 11/2038 701/1 |
| 2013/0253773 A1* | 9/2013 | Itamoto | B62D 5/0484 701/43 |
| 2016/0149534 A1* | 5/2016 | Guo | H02P 29/028 318/461 |
| 2016/0280257 A1* | 9/2016 | Miura | B62D 5/0484 |
| 2016/0295487 A1* | 10/2016 | Pandit | H04W 36/035 |
| 2017/0203784 A1* | 7/2017 | Jeannin | B62D 5/0463 |
| 2017/0287338 A1* | 10/2017 | Neubecker | G08G 1/167 |
| 2018/0348754 A1* | 12/2018 | Samii | G05D 1/0077 |
| 2019/0018408 A1* | 1/2019 | Gulati | G08G 1/09623 |
| 2019/0250611 A1* | 8/2019 | Costin | G05D 1/0257 |
| 2019/0382045 A1* | 12/2019 | Sachs | G07C 5/085 |
| 2020/0039529 A1* | 2/2020 | Wang | B60R 21/01 |
| 2020/0162980 A1* | 5/2020 | Kalkunte | H04B 7/0617 |
| 2020/0342697 A1* | 10/2020 | Kato | B60W 50/023 |
| 2021/0163025 A1* | 6/2021 | Isoyama | H04L 12/40 |
| 2021/0206427 A1* | 7/2021 | Balogh | B62D 5/046 |
| 2021/0300392 A1* | 9/2021 | Shionome | G07C 5/0816 |
| 2022/0009508 A1* | 1/2022 | Rapp | B60R 16/0231 |
| 2022/0111889 A1* | 4/2022 | Sato | B62D 5/046 |

FOREIGN PATENT DOCUMENTS

| | | | |
|---|---|---|---|
| CN | 106998351 A | | 8/2017 |
| CN | 109693707 A | * | 4/2019 ............. B62D 5/003 |
| CN | 110116752 A | | 8/2019 |
| DE | 102016210324 A1 | | 12/2016 |
| DE | 102018102320 A1 | | 8/2018 |
| EP | 2623395 B1 | | 8/2013 |
| JP | 2009262609 A | | 11/2009 |
| JP | 2010143458 A | | 7/2010 |
| JP | 2012009941 A | | 1/2012 |
| WO | 2019154903 A1 | | 8/2019 |

OTHER PUBLICATIONS

Chinese Office Action and Search Report fro the Chinese Patent Office for related Chinese Patent Application No. 202110423416.4 dated Jan. 5, 2023, 9 pages.

* cited by examiner

SYSTEMS AND METHOD FOR ELECTRONIC POWER STEERING REDUNDANT BUS COMMUNICATION

TECHNICAL FIELD

This disclosure relates to electronic power steering and in particular to redundant bus communication for an electronic power steering system.

BACKGROUND OF THE INVENTION

Vehicles, such as cars, trucks, sport utility vehicles, crossovers, mini-vans, or other suitable vehicles, typically include power steering features, such as an electronic power steering (EPS) system. The EPS system is typically configured to provide a steering assist to an operator of a corresponding vehicle. For example, the EPS system may be configured to apply an assist torque to an electric motor, which is connected to a steering mechanism. As the operator interacts with a handwheel or steering wheel associated with the steering mechanism, the amount of force or torque applied by the operator on the handwheel or steering wheel is assisted (e.g., reducing amount of force or torque required by the operator to perform a corresponding steering maneuver) by the electric motor.

Typically, the EPS system communicates with one or more sensors configured to measure various aspects of the vehicle. The EPS system may communicate with the one or more sensors using a vehicle communication system, such as a communication bus. The EPS system may communication with the one or more sensors using the vehicle communication system to receive the various measurements from the one or more sensors. The EPS system may include a controller configured to determine the assist torque based on the various measurements. The controller may then provide the assist torque to the electric motor to provide the steering assist to the operator of the vehicle.

SUMMARY OF THE INVENTION

This disclosure relates generally to electronic power steering systems.

An aspect of the disclosed embodiments includes a system for providing steering assist for a vehicle. The system includes a processor and a memory. The memory includes instructions that, when executed by the processor, cause the processor to: determine whether a primary communication system of the vehicle communicated a first vehicle speed signal, the first vehicle speed signal indicating a first vehicle speed of the vehicle; in response to a determination that the primary communication system did not communicate the first vehicle speed signal, detect a fault in the primary communication system; in response to detecting the fault in the primary communication system, determine whether a secondary communication system communicated a second vehicle speed signal, the second vehicle speed signal indicating a second vehicle speed of the vehicle; and, in response to a determination that the secondary communication system communicated the second vehicle speed signal, selectively provide steering assist to a steering mechanism of the vehicle based on the second vehicle speed of the vehicle.

Another aspect of the disclosed embodiments includes a method for providing steering assist for a vehicle. The method includes determining whether a primary communication system of the vehicle communicated a first vehicle speed signal, the first vehicle speed signal indicating a first vehicle speed of the vehicle. The method also includes, in response to a determination that the primary communication system did not communicate the first vehicle speed signal, detecting a fault in the primary communication system. The method also includes, in response to detecting the fault in the primary communication system, determining whether a secondary communication system communicated a second vehicle speed signal, the second vehicle speed signal indicating a second vehicle speed of the vehicle. The method also includes, in response to a determination that the secondary communication system communicated the second vehicle speed signal, selectively providing steering assist to a steering mechanism of the vehicle based on the second vehicle speed of the vehicle.

Another aspect of the disclosed embodiments includes an apparatus for providing steering assist for a vehicle. The apparatus includes a processor and a memory. The memory includes instructions that, when executed by the processor, cause the processor to: determine whether a first communication system of the vehicle communicated a first vehicle speed signal, the first vehicle speed signal indicating a first vehicle speed of the vehicle; in response to a determination that the first communication system did not communicate the first vehicle speed signal, detect a fault in the first communication system; in response to detecting the fault in the first communication system, determine whether a second communication system communicated a second vehicle speed signal, the second vehicle speed signal indicating a second vehicle speed of the vehicle; in response to a determination that the second communication system did not communicate the second vehicle speed signal, identify at least one default vehicle speed; and selectively provide steering assist to a steering mechanism of the vehicle based on the default vehicle speed of the vehicle.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
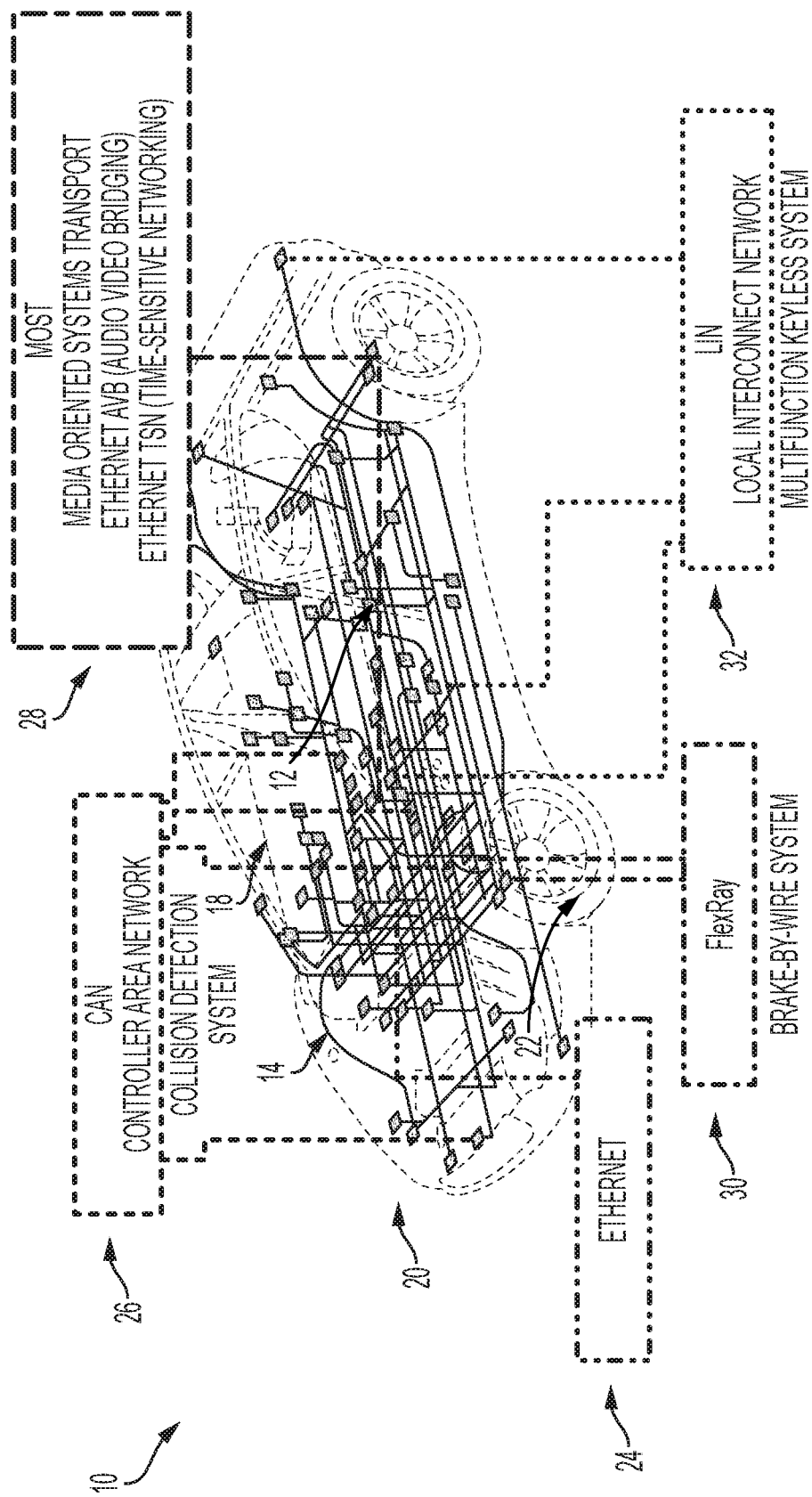
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, or other suitable vehicles, typically include power steering features, such as an electronic power steering (EPS) system. The EPS system is typically configured to provide a steering assist to an operator of a corresponding vehicle. For example, the EPS system may be configured to apply an assist torque to an electric motor, which is connected to a steering mechanism. As the operator interacts with a handwheel or steering wheel associated with the steering mechanism, the amount of force or torque applied by the operator on the handwheel or steering wheel is assisted (e.g., reducing amount of force or torque required by the operator to perform a corresponding steering maneuver) by the electric motor.

Typically, the EPS system communicates with one or more sensors configured to measure various aspects of the vehicle. For example, the one or more sensors may measure vehicle speed, vehicle yaw rate, wheel angle, handwheel or steering wheel angle, steering column position, other suitable measurements, or a combination thereof. The EPS system may communicate with the one or more sensors using a vehicle communication system. The communication system may include communication bus, such as a controller area network (CAN) bus, or other suitable communication system. The EPS system may communication with the one or more sensors using the vehicle communication system to receive the various measurements from the one or more sensors. The EPS system may include a controller configured to determine the assist torque based on the various measurements. The controller may then provide the assist torque to the electric motor to provide the steering assist to the operator of the vehicle.

However, in during operation of the vehicle, the EPS system may be unable to communicate with the one or more sensors using communication system. For example, the vehicle ignition may be in an off position, a fault may occur in the communication system (e.g., such as a fault in the CAN bus), and he like. If the EPS system cannot communicate with the one or more sensors using the communication system, the EPS system may not receive the various measurements from the one or more sensors. For example, the EPS system may not receive a vehicle speed measurement or signal indicating a vehicle speed of the vehicle. If the EPS system does not receive the various measurements, the EPS system may not generate the assist torque and, consequently, may not provide the steering assist to the operator.

Typically, such EPS systems may rely on default values to provide a default steering assist to the operator, if the EPS system does not receive the various measurements from the one or more sensors. For example, the EPS system may retrieve or receive a default vehicle speed value if the EPS system does not receive the vehicle speed measurement or signal from the one or more sensors using the communication system. However, such default vehicle speed values may provide a limited steering assist, which may make performing steering maneuvers difficult for some operators.

Accordingly, systems and methods, such as those described herein, configured to provide redundant communication (e.g. redundant bus communication) for the EPS system, may be desirable. The systems and methods described herein may be configured to detect a fault in the communication system (e.g., the CAN bus). The systems and methods described herein may be configured to enable a backup communication system for receiving the various measurements, in response to a detected fault in the CAN bus. The systems and methods described herein may be configured to use a multimedia infotainment system of the vehicle to communicate information typically communicated using the CAN bus (e.g., various measurements from the one or more sensors). The systems and methods described herein may be configured to use the controller of the EPS to communicate over a wireless network of the vehicle to receive the various measurements from the multimedia infotainment system.

In some embodiments, the systems and methods described herein may be configured to detect a fault in the wireless network and/or the multimedia infotainment system. The systems and methods described herein may be configured to, in response to detecting a fault in one of the wireless network and the multimedia infotainment system retrieve or receive the default vehicle measurement values, such as the default vehicle speed value.

In some embodiments, the systems and methods described herein may be configured to improve stability of the vehicle electronic power steering control and improve operating experience of the vehicle, when a fault is detected in the CAN bus.

In some embodiments, the systems and methods described herein may be configured to determine whether a primary communication system of the vehicle communicated a first vehicle speed signal. The first vehicle speed signal may be indicative of a first vehicle speed of the vehicle. The systems and methods described herein may be configured to, in response to a determination that the primary communication system did not communicate the first vehicle speed signal, detect a fault in the primary communication system. The systems and methods described herein may be configured to, in response to detecting the fault in the primary communication system, determine whether a secondary communication system communicated a second vehicle speed signal, the second vehicle speed signal indicating a second vehicle speed. The systems and methods described herein may be configured to, in response to a determination that the secondary communication system communicated the second vehicle speed signal, selectively provide steering assist to a steering mechanism of the vehicle based on the second vehicle speed of the vehicle. The systems and methods described herein may be configured to, in response to a determination that the secondary communication system did not communicate the second vehicle speed signal, identify a default vehicle speed. The systems and methods described herein may be configured to selective provide steering assist to a steering mechanism of the vehicle based on the default vehicle speed.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2:
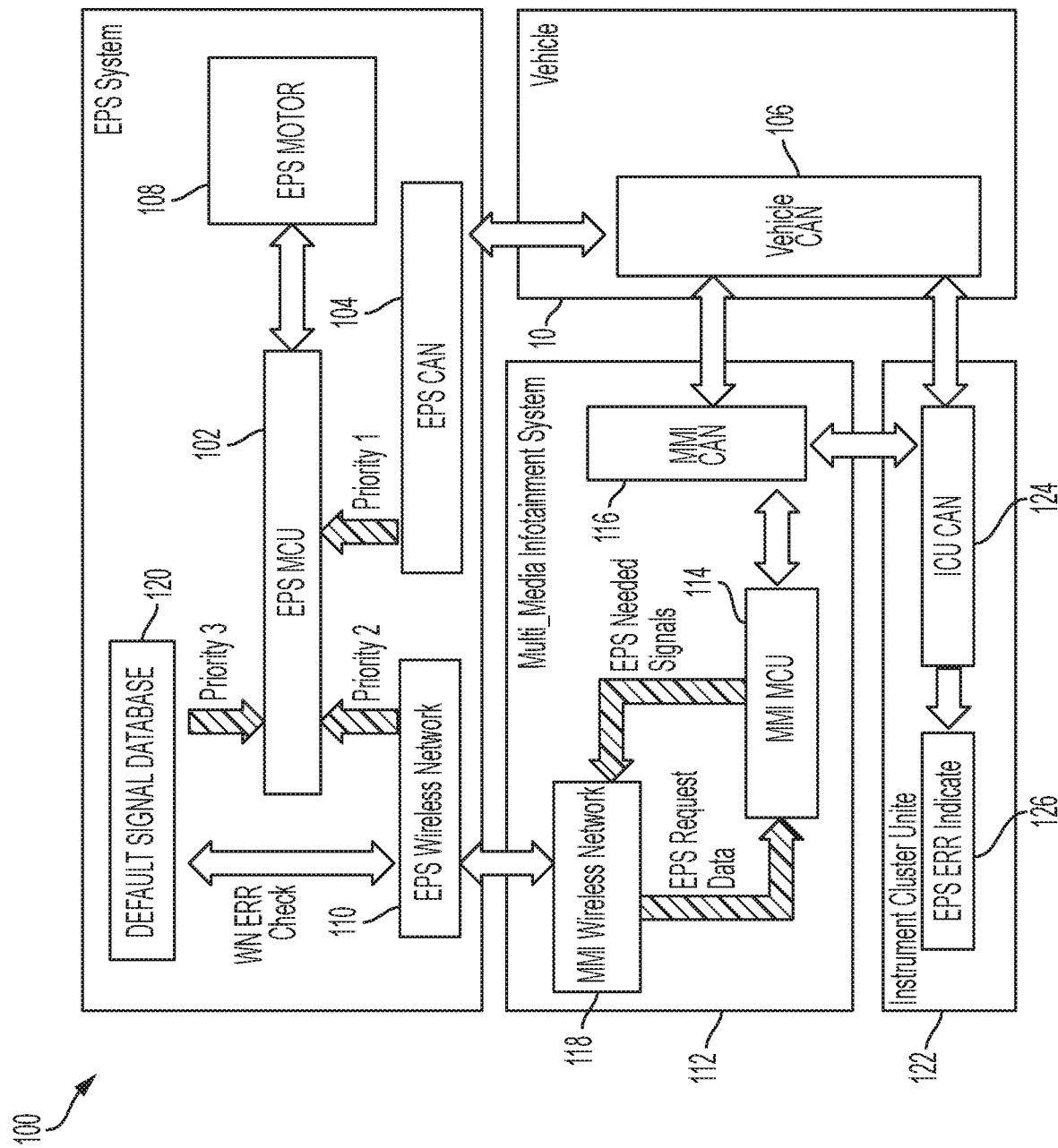
FIG. 2 generally illustrates a block diagram of an electronic power steering system according to the principles of the present disclosure.
Figure 3:
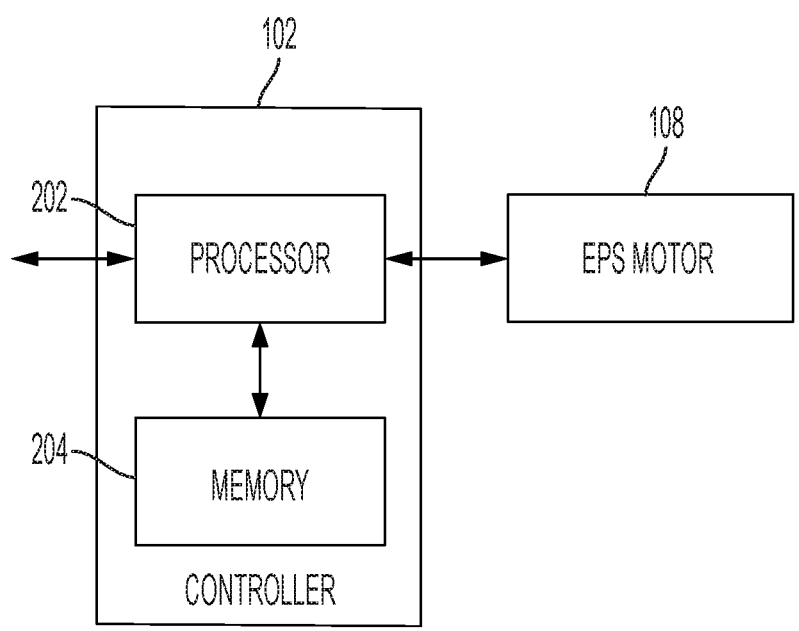
FIG. 3 generally illustrates a steering assist system according to the principles of the present disclosure.

FIG. 2 generally illustrates a block diagram of an electronic power steering (EPS) system 100 according to the principles of the present disclosure. The EPS system 100 may be configured to assist and/or control steering of the vehicle 10. The EPS system 100 may include or be in communication with various sensors configured to measure various aspects of the steering system of the vehicle 10. The EPS system 100 may include controller, such as an EPS microcontroller unit (MCU) 102, herein after referred to as the controller 102. The controller 102 may include a processor 202 and a memory 204, as is generally illustrated in FIG. 3. The processor 202 may include any suitable processor, such as those described herein. Additionally, or alternatively, the controller 102 may include any suitable number of processors, in addition to or other than the processor 202. The memory 204 may comprise a single disk or a plurality of disks (e.g., hard drives), and includes a storage management module that manages one or more partitions within the memory 204. In some embodiments, memory 204 may include flash memory, semiconductor (solid state) memory or the like. The memory 204 may include Random Access Memory (RAM), a Read-Only Memory (ROM), or a combination thereof. The memory 204 may include instructions that, when executed by the processor 202, cause the processor 202 to, at least, control various aspects of the EPS system 100.

The EPS system 100 may include an EPS controller area network (CAN) bus 104. The EPS CAN bus 104 may be in communication with a vehicle CAN bus 106 of the vehicle 10. The vehicle CAN bus 106 may include features similar to those of the CAN bus 26 or other suitable features. The vehicle CAN bus 106 may communicate with various sensors within the vehicle 10 and receive various measurements from the various sensors. For example, the one or more sensors of the vehicle 10 may measure vehicle speed of the vehicle 10, vehicle yaw rate of the vehicle 10, handwheel or steering wheel angle of the vehicle 0, road wheel angle of the vehicle 10, other suitable measurements, or a combination thereof. The vehicle CAN bus 106 may receive, from a controller of the vehicle 10, one or more signals indicating the various measurements. For example the vehicle CAN bus 106 may receive a vehicle speed signal indicating a measured vehicle speed of the vehicle 10. The vehicle CAN bus 106 may communicate the one or more signals to the EPS CAN bus 104. The EPS CAN bus 104 may communicate the one or more signals to the controller 102. The EPS CAN bus 104 and the vehicle CAN bus 106 may collectively be referred to as a first or primary communication system.

The controller 102 may determine various values corresponding to the one or more signals. For example, the controller 102 may receive a vehicle speed signal (e.g., a first vehicle speed signal) and may determine a vehicle speed value (e.g., a first vehicle speed) based on the vehicle speed signal. The controller 102 may determine one or more assist torque values based on the various values determined from the one or more signals. The one or more assist torque values may correspond to an amount of torque to be provided to an EPS motor 108. The controller 102 selectively control the EPS motor 108 using the one or more assist torque values. The EPS motor 108 may be in communication with the steering system, such as a steer-by-wire system or other suitable steering system of the vehicle 10. The EPS motor 108, when controlled according to the one or more assist torque values, provides a steering assist to steering components of the steering system of the vehicle 10. The steering assist may reduce an amount of torque or force required by the operator of the vehicle 10 to execute a corresponding steering maneuver.

In some embodiments, the controller 102 may be configured to detect a fault in the primary communication system (e.g., the EPS CAN bus 104 and/or the vehicle CAN bus 106). For example, the controller 102 may determine whether the vehicle CAN bus 106 communicated the vehicle speed signal (e.g., and/or other various signals) to the EPS Can bus 104 and/or the controller 102. If the controller 102 determines the vehicle CAN bus 106 communicated the vehicle speed signal, the controller 102 may generate the one or more assist torque values based on the vehicle speed corresponding to the vehicle speed signal. The controller 102 may selectively provide the one or more assist torque values to the EPS motor 108, as described.

Conversely, if the controller 102 determines that the vehicle CAN bus 106 did not communicate the vehicle speed signal (e.g., and/or any other of the various signals), the controller 102 determines that a fault occurred in the vehicle CAN bus 106 and/or the EPS CAN bus 104. The fault may include a loss of communication or connectivity between the vehicle CAN bus 106 and the EPS CAN 104, a hardware failure in the vehicle CAN bus 106 and/or the EPS CAN bus 104, any other suitable fault, or a combination thereof. It should be understood that the controller 102 may detect a fault in the vehicle CAN bus 106 and/or the EPS CAN bus 104 in any suitable manner other than those described herein.

In response to determining that a fault occurred in the EPS CAN bus 104 and/or the vehicle CAN bus 106, the controller 102 may communicate with an EPS wireless network 110. The EPS wireless network 110 may include any suitable network. The EPS wireless network 110 may be configured to communicate with a multimedia infotainment (MMI) system 112. The MMI system 112 may include any suitable infotainment system and may be disposed within the vehicle 10. The MMI system 112 may include an MMI MCU 114, an MMI CAN bus 116, and an MMI wireless network 118. The MMI system 112 may include additional or fewer features than those described herein.

In some embodiments, the MMI CAN bus 116 may be in communication with the vehicle CAN bus 106. The vehicle CAN bus 106 may be configured to communicate the various signals to the MMI CAN bus 116. For example, the vehicle CAN bus 106 may communicate the various signals to the EPS CAN bus 104 and the MMI CAN bus 116 in parallel, simultaneously, or substantially simultaneously. In some embodiments, the vehicle CAN bus 106 may communicate some or all of the various signals. For example, the vehicle CAN bus 106 may communicate the various signals after a predetermined period or in response to a fault occurring in communication or connectively between the vehicle CAN bus 106 and the EPS CAN 104.

The MMI CAN bus 116 may communicate the various signals to the MMI MCU 114. In response to the controller 102 detecting a fault in the vehicle CAN bus 106 and/or the EPS CAN bus 104, the controller 102 may communicate with the MMI MCU 114, via the EPS wireless network 110 and the MMI wireless network 118. The EPS wireless network 110 and the MIMI wireless network 118 may be collectively referred to as a second or secondary communication system. The controller 102 may request that the MMI MCU 114 communicate the various signals to the controller 102. Additionally, or alternatively, the MMI MCU 114 may communicate the various signals to the controller 102 continuously, in response to a signal indicating a fault in the vehicle CAN bus 106 and/or the EPS CAN bus 104, in any other suitable scenario, or a combination thereof.

The controller 102 may receive the various signals from the MMI MCU 114 and may determine or generate the one or more assist torque values. For example, the controller 102 may receive a second vehicle speed signal from the MMI MCU 114. The second vehicle speed signal may indicate a second vehicle speed of the vehicle. The second vehicle speed may be the same as or different from the first vehicle speed (e.g., the vehicle speed corresponding to the vehicle speed signal communicated by the vehicle CAN bus 106) if the controller 102 received the vehicle speed signal from the vehicle CAN bus 106 before detecting the fault. The controller 102 generates the one or more assist torque values based on the second vehicle speed. The controller 102 may selectively provide the one or more assist torque values to the EPS motor 108, as described.

In some embodiments, the controller 102 may be configured to detect a fault in the secondary communication system (e.g., the EPS wireless network 110 and the MMI wireless network 118). For example, the controller 102 may determine whether the MMI wireless network 118 communicated the second vehicle speed signal (e.g., and/or other various signals) to the EPS wireless network 110 and/or the controller 102. If the controller 102 determines that the MMI wireless network 118 communicated the second vehicle speed signal, the controller 102 may generate the one or more assist torque values and selectively provide the one or more assist torque values to the EPS motor 108, as described.

Conversely, if the controller 102 determines that the MMI wireless network 118 did not communicate the second vehicle speed signal (e.g., and/or any other of the various signals), the controller 102 determines that a fault occurred in the MMI wireless network 118 and/or the EPS wireless network 110. The fault may include a loss of communication or connectivity between the MMI wireless network 118 and the EPS wireless network 110, a hardware failure in the MMI system 112, a hardware failure in the MMI wireless network 118, a hardware failure in the EPS wireless network 110, any other suitable fault, or a combination thereof. It should be understood that the controller 102 may detect a fault in the MMI wireless network 118 and/or the EPS wireless network 110 in any suitable manner other than those described herein.

In response to determining that a fault occurred in the MMI wireless network 118 and/or the EPS wireless network 110, the controller 102 may retrieve or receive one or more default signals from a default signal database 120. The default signal database 120 may include any suitable database or memory storage. The default signal database 120 may be disposed on or in the vehicle 10, remotely located from the vehicle 10 (e.g., on a remotely located computing device, such as a cloud computing device), or any other suitable location. The default signals may include signals corresponding to various characteristics of the vehicle. For example, the default signals may include a default vehicle speed signal.

The default vehicle speed signal may indicate a default vehicle speed. The default vehicle speed may be a predetermined vehicle speed stored in the default signal database 120. Additionally, or alternatively, the EPS wireless network 110 may communicate the second vehicle speed signal to the default signal database 120 periodically and/or the EPS wireless network 110 may communicate the second vehicle speed signal to the default signal database 120 and the controller 102 in parallel, simultaneously, or substantially simultaneously. Accordingly, the default vehicle speed signal may be indicative of a previous vehicle speed of the vehicle (e.g., a vehicle speed measured prior to a fault occurring in the MMI wireless network 118 and/or the EPS wireless network 110).

The controller 102 may generate the one or more assist torque values based on the default vehicle speed indicated by the default vehicle speed signal. The controller 102 may selectively control the EPS motor 108 using the one or more assist torque values, as described.

In some embodiments, the controller 102 may provide an indication to the operator that a fault occurred in one or more of the EPS CAN bus 104, the vehicle CAN bus 106, the EPS wireless network 110, and/or the MMI wireless network 118. For example, the vehicle 10 may include an instrument cluster unit (ICU) 122. The ICU 122 may be dispose on a dash, display, or other suitable location of the vehicle 10. The ICU 122 may include an ICU CAN bus 124.

The controller 102 may communicate a signal indicative of the fault using one or more of the EPS CAN bus 104, the vehicle CAN bus 106, the EPS wireless network 110, and/or the MMI wireless network 118. The one or more of the EPS CAN bus 104, the vehicle CAN bus 106, the EPS wireless network 110, and/or the MMI wireless network 118 may communicate, directly or indirectly, the signal indicative of the fault to the ICU CAN bus 124. The ICU CAN bus 124 may communicate the signal indicative of the fault to an EPS error (ERR) indicator 126. The EPS ERR indicator 126 may include any suitable indicator, such as a light display, text on a display, an image on a display, other suitable indicator, or a combination thereof. The EPS ERR indicator 126 may indicate the fault to the operator in response to receiving the signal indicative of the fault.

In some embodiments, the system 100 and/or the controller 102 may perform the methods described herein. However, the methods described herein as performed by the system 100 and/or the controller 102 are not meant to be limiting, and any type of software executed on a controller can perform the methods described herein without departing from the scope of this disclosure. For example, a controller, such as a processor executing software within a computing device, can perform the methods described herein.

Figure 4:
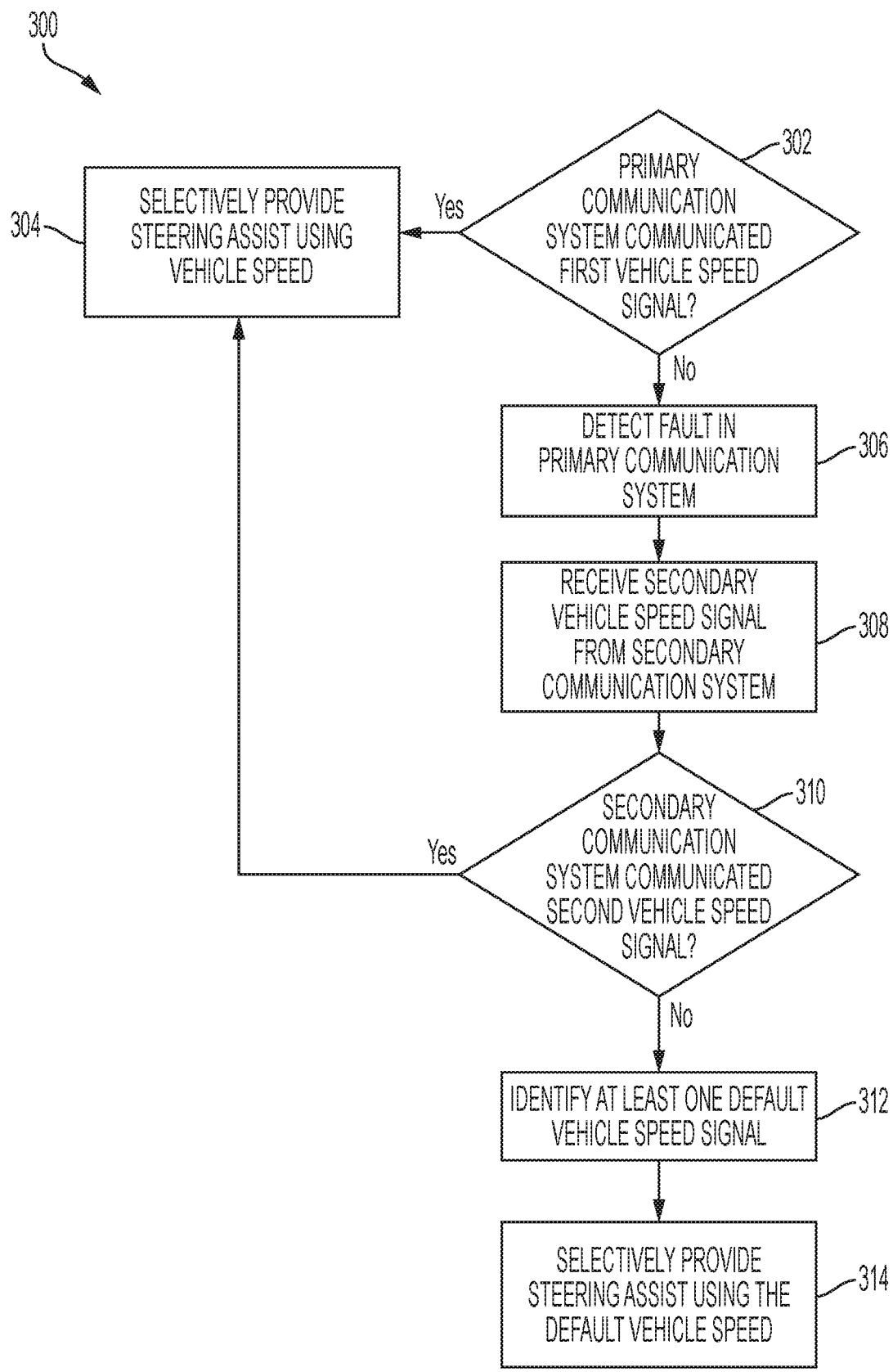
FIG. 4 is a flow diagram generally illustrating a steering assist method method according to the principles of the present disclosure.

FIG. 4 is a flow diagram generally illustrating a steering assist method 300 according to the principles of the present disclosure. At 302, the method 300 determines whether a primary communication system communicated a first vehicle speed signal. For example, the controller 102 determined whether the vehicle CAN bus 106 and/or the EPS CAN bus 104 communicated the first vehicle speed signal. If the controller 102 determines that the primary communication system communicated the first vehicle speed signal, the method continues at 304. If the controller 102 determines that the primary communication system did not communicate the first vehicle speed signal, the method 300 continues at 306.

At 304, the method 300 selectively provides steering assist using the vehicle speed. For example, the controller 102 determines the first vehicle speed using the first vehicle speed signal. The controller 102 generates one or more assist torque values based on the first vehicle speed. The controller 102 selectively controls the EPS motor 108 using the one or more assist torque values.

At 306, the method 300 detects a fault in the primary communication system. For example, the controller 102 detects and/or determines a fault in the vehicle CAN bus 106, the EPS CAN bus 104, or a combination thereof.

At 308, the method 300 receives a secondary vehicle speed signal from a secondary communication system. For example, the controller 102 receives the second vehicle speed signal from the MMI MCU 114, via the EPS wireless network 110, the MMI wireless network 118, or a combination thereof.

At 310, the method 300 determines whether the secondary communication system communicated the second vehicle speed signal. For example, the controller 102 determines whether the secondary communication system (e.g., the EPS wireless network 110 and/or the MMI wireless network 118) communicated the second vehicle speed signal. If the controller 102 determines that the secondary communication system communicated the second vehicle speed signal, the method 300 continues at 304. If the controller 102 determines that the secondary communication system did not communicate the second vehicle speed signal, the method 300 continues at 312.

At 304, the method 300 selectively provides steering assist using the vehicle speed indicated by the second vehicle speed signal. For example, the controller 102 determines the second vehicle speed using the second vehicle speed signal. The controller 102 generates one or more assist torque values based on the second vehicle speed. The controller 102 selectively controls the EPS motor 108 using the one or more assist torque values.

At 312, the method 300 identifies at least one default vehicle speed. For example, the controller 102 detects and/or determines a fault in the secondary communication system, based on the determination that the secondary communication system did not communicate the second vehicle speed. The controller 102 retrieves or receives one or more default vehicle speed signals from the default signal database 120.

At 314, the method 300 selectively provides steering assist using the default vehicle speed. For example, the controller 102 determines the default vehicle speed indicated by the default vehicle speed signal. The controller 102 generates the one or more assist torque values based on the default vehicle speed. The controller 102 selectively controls the EPS motor 108 using the one or more assist torque values, as described.

In some embodiments, a system for providing steering assist for a vehicle includes a processor and a memory. The memory includes instructions that, when executed by the processor, cause the processor to: determine whether a primary communication system of the vehicle communicated a first vehicle speed signal, the first vehicle speed signal indicating a first vehicle speed of the vehicle; in response to a determination that the primary communication system did not communicate the first vehicle speed signal, detect a fault in the primary communication system; in response to detecting the fault in the primary communication system, determine whether the secondary communication system communicated the second vehicle speed signal, the second vehicle speed signal indicating a second vehicle speed of the vehicle; and in response to a determination that the secondary communication system communicated the second vehicle speed signal, selectively provide steering assist to a steering mechanism of the vehicle based on the second vehicle speed of the vehicle.

In some embodiments, the primary communication system includes an electronic power steering controller area network bus. In some embodiments, the secondary communication system includes an electronic power steering wireless network. In some embodiments, the primary communication system receives a signal indicative of the first vehicle speed from a vehicle controller area network bus. In some embodiments, the primary communication system generates the first vehicle speed signal based on the first vehicle speed. In some embodiments, the secondary communication system receives a signal indicative of the second vehicle speed from an infotainment system of the vehicle. In some embodiments, the secondary communication system generates the second vehicle speed signal based on the second vehicle speed. In some embodiments, the instructions further cause the processor to selectively provide steering assist to the steering mechanism of the vehicle by selectively controlling an electronic power steering motor based on the second vehicle speed. In some embodiments, the instructions further cause the processor to, in response to a determination that the secondary communication system did not communicate the second vehicle speed signal, identify at least one default vehicle speed. In some embodiments, the instructions further cause the processor to selectively provide steering assist to the steering mechanism of the vehicle based on the default vehicle speed of the vehicle.

In some embodiments, a method for providing steering assist for a vehicle includes determining whether a primary communication system of the vehicle communicated a first vehicle speed signal, the first vehicle speed signal indicating a first vehicle speed of the vehicle. The method also includes, in response to a determination that the primary communication system did not communicate the first vehicle speed signal, detecting a fault in the primary communication system. The method also includes, in response to detecting the fault in the primary communication system, determining whether a secondary communication system communicated a second vehicle speed signal. The second vehicle speed signal may indicate a second vehicle speed of the vehicle. The method also includes, in response to a determination that the secondary communication system communicated the second vehicle speed signal, selectively providing steering assist to a steering mechanism of the vehicle based on the second vehicle speed of the vehicle.

In some embodiments, the primary communication system includes an electronic power steering controller area network bus. In some embodiments, the secondary communication system includes an electronic power steering wireless network. In some embodiments, the primary communication system receives a signal indicative of the first vehicle speed from a vehicle controller area network bus. In some embodiments, the primary communication system generates the first vehicle speed signal based on the first vehicle speed. In some embodiments, the secondary communication system receives a signal indicative of the second vehicle speed from an infotainment system of the vehicle. In some embodiments, the secondary communication system generates the second vehicle speed signal based on the second vehicle speed. In some embodiments, the method also includes selectively providing steering assist to the steering mechanism of the vehicle by selectively controlling an electronic power steering motor based on the second vehicle speed. In some embodiments, the method also includes, in response to a determination that the secondary communication system did not communicate the second vehicle speed signal, identifying at least one default vehicle speed. In some embodiments, the method also includes selectively providing steering assist to the steering mechanism of the vehicle based on the default vehicle speed of the vehicle.

In some embodiments, an apparatus for providing steering assist for a vehicle includes a processor and a memory. The memory includes instructions that, when executed by the processor, cause the processor to: determine whether a first communication system of the vehicle communicated a first vehicle speed signal, the first vehicle speed signal indicating a first vehicle speed of the vehicle; in response to a determination that the first communication system did not communicate the first vehicle speed signal, detect a fault in the first communication system; in response to detecting the fault in the first communication system, determine whether a second communication system communicated a second vehicle speed signal, the second vehicle speed signal indicating a second vehicle speed of the vehicle; in response to a determination that the second communication system did not communicate the second vehicle speed signal, identify at least one default vehicle speed; and selectively provide steering assist to a steering mechanism of the vehicle based on the default vehicle speed of the vehicle.

In some embodiments, the first communication system includes an electronic power steering controller area network bus.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A system for providing steering assist for a vehicle, the system comprising:
    a processor; and
    a memory that includes instructions that, when executed by the processor, cause the processor to:
        determine whether a primary communication system of a steering system of the vehicle communicated a first vehicle speed signal, the first vehicle speed signal indicating a first vehicle speed of the vehicle, wherein the primary communication system of the steering system receives a signal indicative of the first vehicle speed via a vehicle controller area network bus, and wherein the primary communication system includes an electronic power steering controller area network bus;
        in response to a determination that the primary communication system of the steering system communicated the first vehicle speed signal, generate one or more assist torque values based on the first vehicle speed of the vehicle;
        in response to a determination that the primary communication system of the steering system did not communicate the first vehicle speed signal, detect a fault in the primary communication system of the steering system;
        in response to detecting the fault in the primary communication system of the steering system;
        wirelessly request, using a secondary communication system that includes an electronic power steering wireless network of the steering system that wirelessly communicates with an infotainment system wireless network, a second vehicle speed signal from an infotainment system of the vehicle in communication with the infotainment system wireless network;
        determine whether the secondary communication system of the steering system communicated, in response to the wireless request from the secondary communication system, the second vehicle speed signal, the second vehicle speed signal indicating a second vehicle speed of the vehicle, wherein the infotainment system receives, in response to the wireless request from the secondary communication system, at least one measurement associated with at least one sensor, the at least one measurement indicating the second vehicle speed and the at least one measurement is communicated to the infotainment system via the vehicle controller area network bus, wherein the infotainment system generates the second vehicle speed signal based on the at least one measurement, and wherein the infotainment wireless network receives the second vehicle speed signal from the infotainment system and wirelessly communicates the second vehicle speed signal to the secondary communication system;
        in response to a determination that the secondary communication system of the steering system communicated the second vehicle speed signal, generate the one or more assist torque values based on the second vehicle speed of the vehicle; and
        provide steering assist to a steering mechanism of the vehicle based on the one or more assist torque values.

2. The system of claim 1, wherein the primary communication system generates the first vehicle speed signal based on the vehicle speed.

3. The system of claim 1, wherein the secondary communication system generates the second vehicle speed signal based on the second vehicle speed.

4. The system of claim 1, wherein the instructions further cause the processor to selectively provide steering assist to the steering mechanism of the vehicle by selectively controlling an electronic power steering motor based on the second vehicle speed.

5. The system of claim 1, wherein the instructions further cause the processor to, in response to a determination that the secondary communication system did not communicate the second vehicle speed signal, identify at least one default vehicle speed and generate the one or more assist torque values based on the default vehicle speed.

6. The system of claim 5, wherein the instructions further cause the processor to selectively provide steering assist to the steering mechanism of the vehicle based on the one or more assist torque value generated based on the default vehicle speed.

7. A method for providing steering assist for a vehicle, the method comprising:
    determining whether a primary communication system of a steering system of the vehicle communicated a first vehicle speed signal, the first vehicle speed signal indicating a first vehicle speed of the vehicle, wherein the primary communication system of the steering system receives a signal indicative of the first vehicle speed via a vehicle controller area network bus, and wherein the primary communication system includes an electronic power steering controller area network bus;

in response to a determination that the primary communication system of the steering system communicated the first vehicle speed signal, generating one or more assist torque values based on the first vehicle speed of the vehicle;

in response to a determination that the primary communication system of the steering system did not communicate the first vehicle speed signal, detecting a fault in the primary communication system of the steering system;

in response to detecting the fault in the primary communication system of the steering system;

wirelessly requesting, using a secondary communication system that includes an electronic power steering wireless network of the steering system that wirelessly communicates with an infotainment system wireless network, a second vehicle speed signal from an infotainment system of the vehicle in communication with the infotainment system wireless network determining whether the secondary communication system of the steering system communicated, in response to the wireless request from the secondary communication system, the second vehicle speed signal, the second vehicle speed signal indicating a second vehicle speed of the vehicle, wherein the infotainment system receives, in response to the wireless request from the secondary communication system, at least one measurement associated with at least one sensor, the at least one measurement indicating the second vehicle speed and the at least one measurement is communicated to the infotainment system via the vehicle controller area network bus, wherein the infotainment system generates the second vehicle speed signal based on the at least one measurement, and wherein the infotainment wireless network receives the second vehicle speed signal from the infotainment system and wirelessly communicates the second vehicle speed signal to the secondary communication system;

in response to a determination that the secondary communication system of the steering system communicated the second vehicle speed signal, generating the one or more assist torque values based on the second vehicle speed of the vehicle; and providing steering assist to a steering mechanism of the vehicle based on the one or more assist torque values.

8. The method of claim 7, wherein the primary communication system generates the first vehicle speed signal based on the first vehicle speed.

9. The method of claim 7, wherein the secondary communication system generates the second vehicle speed signal based on the second vehicle speed.

10. The method of claim 7, further comprising selectively providing steering assist to the steering mechanism of the vehicle by selectively controlling an electronic power steering motor based on the second vehicle speed.

11. The method of claim 7, further comprising, in response to a determination that the secondary communication system did not communicate the second vehicle speed signal, identifying at least one default vehicle speed and generate the one or more assist torque values based on the default vehicle speed.

12. The method of claim 11, further comprising selectively providing steering assist to the steering mechanism of the vehicle based on the one or more assist torque value generated based on the default vehicle speed.

\* \* \* \* \*